United States Patent [19]

Djorup

[11] Patent Number: 4,794,794

[45] Date of Patent: Jan. 3, 1989

[54] THERMAL ANEMOMETER

[76] Inventor: Robert S. Djorup, 20 Lovewell Rd., Wellesley, Mass. 02181

[21] Appl. No.: 924,893

[22] Filed: Oct. 30, 1986

[51] Int. Cl.⁴ .............................................. G01F 1/68
[52] U.S. Cl. ................................... 73/204; 73/204.15; 73/204.18; 341/140
[58] Field of Search .................. 73/204; 324/132, 133, 324/96; 340/347 AD; 307/360

[56] References Cited

U.S. PATENT DOCUMENTS

| | | | |
|---|---|---|---|
| 3,220,255 | 11/1965 | Scranton | 73/204 |
| 3,352,154 | 11/1967 | Djorup | 73/189 |
| 3,363,462 | 1/1968 | Sabin | 73/204 |
| 3,604,261 | 6/1969 | Olin | 73/189 |
| 3,677,085 | 7/1972 | Hayajawa | 73/204 |
| 3,900,819 | 8/1975 | Djorup | 338/320 |
| 3,946,364 | 3/1976 | Codomo et al. | 374/170 X |
| 3,987,392 | 10/1976 | Kugelmann | 324/96 |
| 3,991,624 | 11/1976 | Davies | 73/189 |
| 3,995,481 | 12/1976 | Djorup | 73/189 |
| 4,024,761 | 5/1977 | Djorup | 73/204 |
| 4,122,439 | 10/1978 | Ninomiya | 340/347 AD |
| 4,183,016 | 1/1980 | Sawagata | 340/347 AD |
| 4,206,638 | 6/1980 | Djorup | 73/189 |
| 4,279,147 | 7/1981 | Djorup | 73/189 |
| 4,373,387 | 2/1983 | Nishimura | 73/204 |
| 4,482,862 | 11/1984 | Leehey | 324/117 R |
| 4,503,390 | 3/1985 | Wells, Jr. | 324/133 |
| 4,503,706 | 3/1985 | Kolodjski | 73/204 |
| 4,523,462 | 6/1985 | Kolodjski | 73/204 |
| 4,549,433 | 10/1985 | Gneiss et al. | 73/204 |
| 4,626,777 | 12/1986 | Ainsworth | 324/117 R |
| 4,692,738 | 9/1987 | Suzuki | 340/347 AD X |

OTHER PUBLICATIONS

"Modern Developments in Fluid Dynamics" edited by S. Goldstein, composed by the Fluid Motion Panel of the Aeronautical Research Committee and Others, vol. 1, pp. 21-26, 36-41 and 59-65.

Primary Examiner—Herbert Goldstein

[57] ABSTRACT

A thermal anemometer, including a constant temperature anemometer bridge excitation circuit together with multiple signal comparators and a tapped resistance reference divider, providing a linearized digital output signal, together with a digitally controlled output section that presents a simultaneous linear analog output signal. All logic switching is actuated by the anemometer signal itself. Both unipolar (non-directional) and bipolar (directional) constant temperature anemometer signals are linearized, digitized, and processed with a minimum number of steps and component parts to provide simultaneous digital and analog output signals. Generic transducer electrical output signal digitizing is disclosed.

6 Claims, 2 Drawing Sheets

|  | UNIPOLAR | BIPOLAR |  |
|---|---|---|---|
|  | 1 2 n | Sign 1 2 n |  |
| FULL SCALE + | 1 1 1 | 1 1 1 1 |  |
|  | 1 1 0 | 1 1 1 0 |  |
|  | 1 0 0 | 1 1 0 0 | TRUTH TABLE |
| ZERO + / − | 0 0 0 | 1/0 0 0 0 | Fig. 6 |
|  |  | 0 1 0 0 |  |
|  |  | 0 1 1 0 |  |
| FULL SCALE − |  | 0 1 1 1 |  |

THERMAL ANEMOMETER

TECHNICAL FIELD

This invention relates generally to improved thermal anemometer sensing apparatus for determining the motion of a fluid mass which surrounds a constant temperature anemometer sensing element transducer. The invention is particularly concerned with means for transducer signal digitizing, means for transducer signal linearization and the provision of electrical output signals in both digital and analog form. The invention provides means for the processing of unipolar single sensing element or bipolar dual sensing element transducer output signals with a minimal number of operations and electrical circuit components.

BACKGROUND ART

The use of electrically heated wires and films as constant temperature anemometer transducers is well known in the prior art. In such devices a heated resistance element serves as a sensing element and its physical geometry is used to define its spatial response to impinging fluid flow. Most widespread use has been in the measurement of airflow. The sensing element has a temperature coefficient of resistance and is maintained at constant resistance and, thus, constant temperature while it is operated as part of a feedback controlled electrical bridge circuit. An example of such a prior art constant temperature anemometer circuit is illustrated in FIG. 1 wherein a single sensing element is shown at 10 and forms one arm of a four arm Wheatstone bridge which is completed by resistances 11, 12 and 13. Differential amplifier 14 is connected to the bridge at points 15 and 16 in order to determine bridge balance or bridge error signal and amplifier 14 output 17 is fed back to the bridge in order to provide bridge excitation. For clarity's sake power supply connections are not shown in this figure and those following. The resulting signal output 17 is unipolar and is markedly non-linear, containing three components. These are an approximate fourth root term as a function of mean flow, a d-c or constant term which is the zero flow quiescent heating signal, and a turbulence component which results from fluctuations in the flow. Examples of single-ended unipolar constant temperature anemometer transducers, together with bridge operating circuits therefor, are shown in U.S. Pat. Nos. 3,220,225; 3,352,154; 3,363,462; 3,900,819; 3,991,624; 4,373,387; 4,503,706 and 4,523,462.

U.S Pat. Nos. 3,220,255 and 3,363,462 describe the non-linearity of the single-ended constant temperature anemometer bridge output signal in detail and teach us means for analog signal processing in order to provide a linearized output signal.

A prior art example of bipolar operation of a constant temperature anemometer transducer is shown in FIG. 2 wherein two series connected resistive sensing elements 10a and 10b produce a bipolar non-linear output. Two sensing elements 10a and 10b together with resistors 18 and 19 form a second Wheatstone bridge in place of the single sensing element 10 of FIG. 1. A differential amplifier 22, connected to points 20 and 21, provides a composite bridge output signal 23 which contains the above mentioned non-linear mean flow term with implicit polarity sign and a turbulence component but no d-c or constant term. Examples of differential bipolar constant temperature anemometer transducers, together with bridge operating circuits therefor, are shown in U.S. Pat. No. 4,279,147 and in co-pending U.S. patent application Ser. No. 866,604 filed May 23, 1986. Examples of unipolar bridge signal with separate sign sensing output constant temperature anemometer transducers, together with bridge operating circuits therefor, are shown in U.S. Pat. Nos. 3,352,154; 3,900,819; 3,991,624; 3,995,481; 4,024,761 and 4,206,638.

SUMMARY OF THE INVENTION

The present invention provides a significant improvement in constant temperature anemometers with generation of digital anemometer output signals, anemometer signal linearization, and means to also constitute the anemometer output in linear analog form. The linear constant temperature anemometer according to the present invention uses an anemometer bridge circuit produced non-linear signal that is connected to a group of parallel voltage comparator inputs wherein a second input to each comparator is connected to a non-linear voltage divider resistance network that is excited by a reference voltage which may be used to set the anemometer's full scale output level. The combination of comparators, reference voltage divider and single sensing element constant temperature anemometer bridge circuit defines a unique linear constant temperature anemometer. Bipolar operation of the instrument can be provided by the use of an additional comparator that is used to control and switch the sign of the reference voltage source as incident flow changes direction which is sensed by a dual sensing element constant temperature anemometer bridge circuit.

The comparator outputs can be in either of two states which can be identified as a digital "one" or a "zero". Switches operated by the comparators are used to selectively connect input resistors to an output operational amplifier in order to change its gain in accordance with the comparator output coded value. Each switch is connected to the same reference as the voltage divider resistance network in order to maintain sign coherence and the analog output scale factor. In effect, the wind induced anemometer signal is used to sequentially operate comparators which in turn switch selected resistors from a fixed reference voltage to the input of an output amplifier using digital means to linearize the anemometer signal, provide digital anemometer output signals, and generate a concurrent linear analog anemometer output signal with the least number of component parts and signal processing steps.

Customarily, when a raw non-linear transducer signal is to be digitized, the designer turns to the large body of analog-to-digital converters available in the state-of-the-art and where further processing is required, such as linearization, a microprocessor or dedicated computation circuits together with digital storage and programming circuits is usually resorted to. In other words, a general purpose or nearly universal computational system in miniature is resorted to in order to solve a specific and narrow problem. The arithmetic problem solution is then stated by a cleverly written computing algorithm which answers the special case by using a general purpose solution. The present invention is a simple and direct solution which addresses the problem of linearizing and processing a raw non-linear transducer signal directly while, at the same time, providing a digital interface for external operations on the data. It is a dedicated solution to a specific problem which is posed by many different generic transducer types.

BRIEF DESCRIPTION OF THE DRAWING

FIG. 6 depicts a Truth Table illustrating the various truth values for the switch combinations which may obtain in the embodiments shown in FIGS. 3 and 5 when used together.

BEST MODE OF CARRYING OUT THE INVENTION

Figure 1:
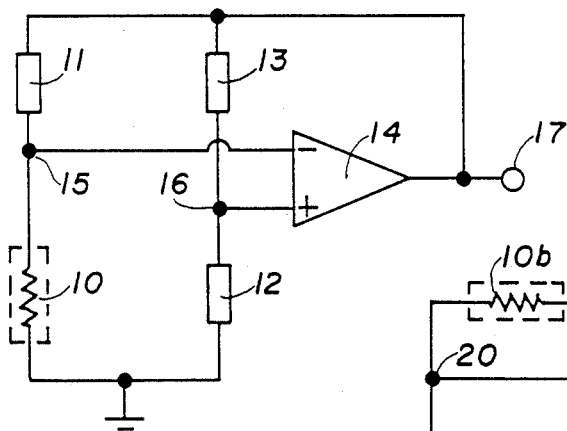
FIG. 1 illustrates a prior art constant temperature anemometer controlled bridge electrical circuit with unipolar output from a single sensing element.
Figure 3:
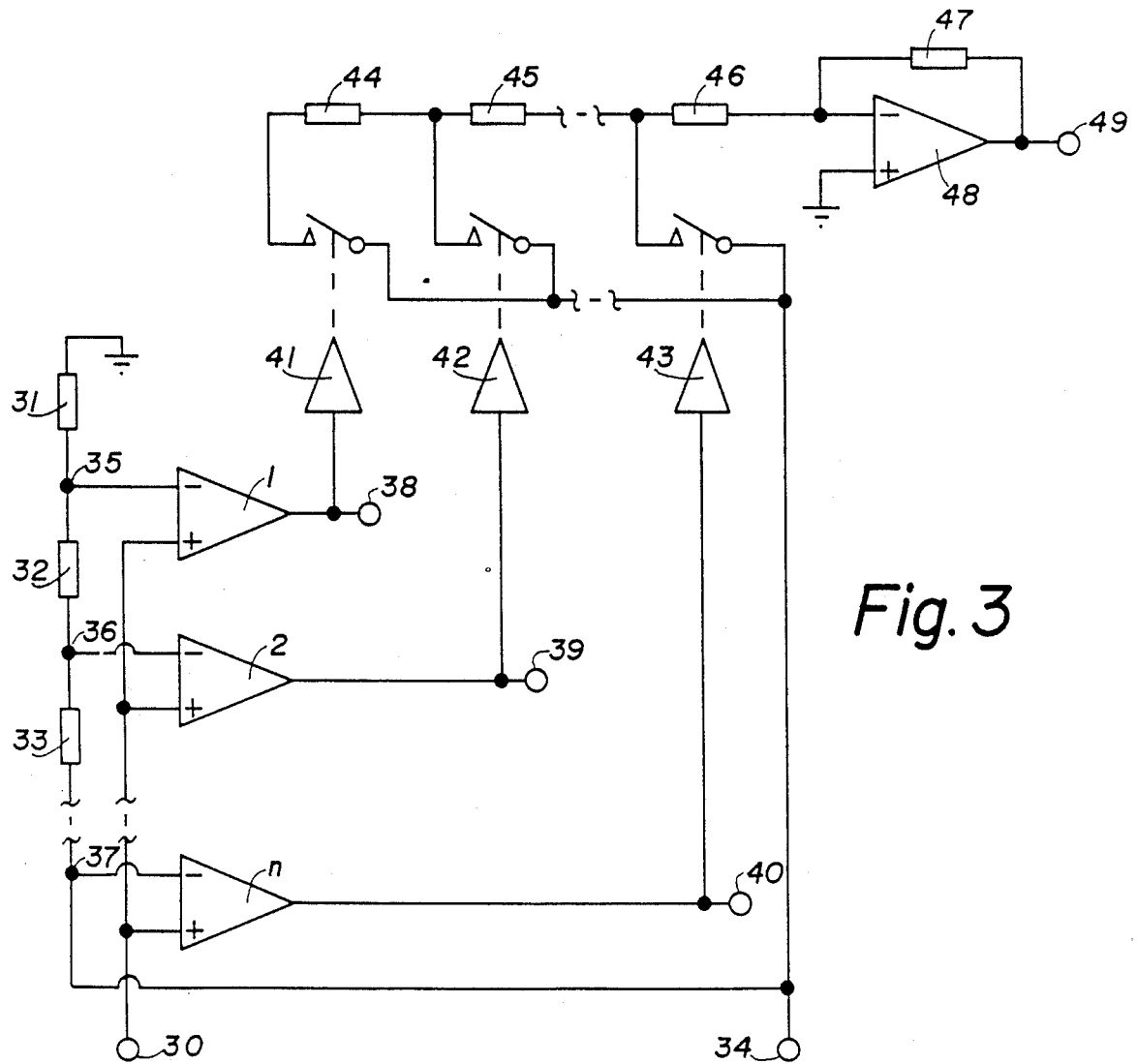
FIG. 3 illustrates a preferred embodiment of the present invention in a form suitable for unipolar operation.

Referring now to the drawing, and in particular to FIG. 3, the numeral 30 designates the signal input connection to parallel comparators 1, 2 and n. Any number of comparators may be used, depending only on the system resolution which is desired, and three are shown by example. The unipolar input signal 30 may be taken from the anemometer bridge output 17 of FIG. 1 and in this example will be defined as positive going. The other input to each comparator 1, 2 and n is connected to a series resistance divider 31, 32 and 33 which is connected between electrical ground and a positive reference voltage input applied at point 34. The reference voltage input 34 must be greater than the level of the full scale value of anemometer bridge input signal at 30 in order that comparator n can be used to determine when the anemometer full scale is reached or exceeded. The divider connections for comparators 1, 2 and n are at points 35, 36 and 37 respectively. When the reference voltage input at 34 is of positive polarity the output of the comparators will be at logical "0" until the positive input signal level 30 magnitude rises above the resistance voltage divider 31, 32 and 33 level at points 35, 36 and 37, respectively, corresponding to the reference inputs for comparators 1, 2 and n. When the signal 30 rises above that of the divided reference level to each comparator the comparator will switch or flip to the opposite condition or to a logical "1" at outputs 38, 39 and 40. As the input signal magnitude 30 rises each comparator consecutively switches from logical "0" to logical "1" and as the input signal magnitude falls the comparators will consecutively switch back to logical "0" from logical "1. This elemental coding technique is often called magnitude coding. The described means can be applied to virtually any transducer transfer function ranging from the linear to the sharply non-linear. Typical units which may be used as the described comparators 1, 2 and n are the National Semiconductor Corp. type LM-139 (quad comparator) or LM-124 (quad operational amplifier) used as a comparator.

Figure 4:
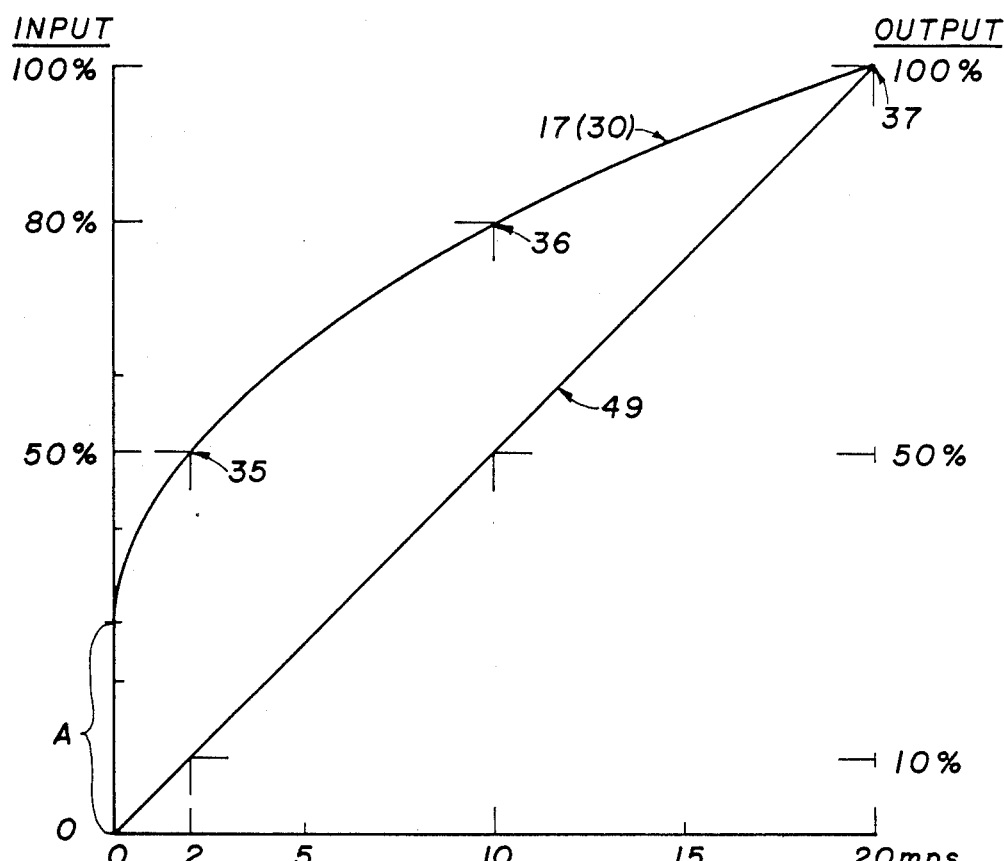
FIG. 4 is a diagram showing both the non-linear relationship of the output of a single sensing element constant temperature anemometer bridge circuit to wind flow against the sensing element and a desired linear output signal.

FIG. 4 illustrates graphically a typical unipolar non-linear constant temperature anemometer transfer function, (17)30, which is shown, for example, to vary from 0 to 20 mps for the abscissas and from 0 to 100% for the ordinates. Three points are identified, 35, 36 and 37, corresponding to their FIG. 3 level designations. Coordinates of points 35, 36 and 37 are (2 mps, 50%), (10 mps, 80%) and (20 mps, 100%), respectively Using these coordinates, typical values of the resistive divider are resistor 31 equals 5,000 ohms, resistor 32 equals 3,000 ohms and resistor 33 equals 2,000 ohms for a total divider value of 10,000 ohms. The ordinate portion A is equivalent to the zero flow quiescent heating signal level referred to under the description of FIG. 1.

Referring again to FIG. 3, each of the comparator outputs 38, 39 and 40 are connected to switch drivers 41, 42 and 43, respectively. Typical switches with drivers which may be used are Siliconix type DG202 (Quad Monolithic SPST CMOS Analog Switches) which are normally off (open) when logical "0" is supplied to the driver. The switch closes when logical "1" is supplied. Reference voltage input 34 is connected to one side of each switch 41, 42 and 43 and the reference voltage is connected to an input resistor to amplifier 48 when a "1" appears at the comparator 1, 2 or n outputs. Amplifier 48 is shown as an inverting amplifier with feedback resistor 47 and input resistors 44, 45 and 46. The anemometer instrument output is at point 49. Amplifier 48 may be an operational amplifier such as the National Semiconductor Corp. type LM-107, LM-158 or LM-124, for example. When driver/switches 41, 42 and 43 are open the output at 49 is zero. As each switch closes the value of the output rises in magnitude to its full scale level when the last switch, 43, closes. If resistor 47 equals resistor 46 the amplifier 48 gain is −1 and the output 49 will be the negative of the reference 34 value. Output level can be changed by adjusting the ratio of the values of resistors 46 and 47 and the output polarity can be reversed by reversing reference 34 polarity or by adding an inverting amplifier.

From the example shown in FIG. 4, a plot of a desired linear output 49 from amplifier 48 of FIG. 3 shows us that the corresponding outputs for points 35, 36 and 37 are at the 10%, 50% and 100% levels, respectively. From this we can refer back to FIG. 3 and determine values for the resistors associated with amplifier 48. If resistor 47, the amplifier feedback resistor, is chosen to be 10,000 ohms, resistor 46 becomes 10,000 ohms, resistor 45 becomes 10,000 ohms, and resistor 44 becomes 80,000 ohms. With switch 41 open, output 49 is zero. When switch 41 closes output 49 goes to 10% of full scale. When switch 42 closes output 49 rises to 50% of full scale, and when switch 43 closes output 49 rises to full scale.

Figure 2:
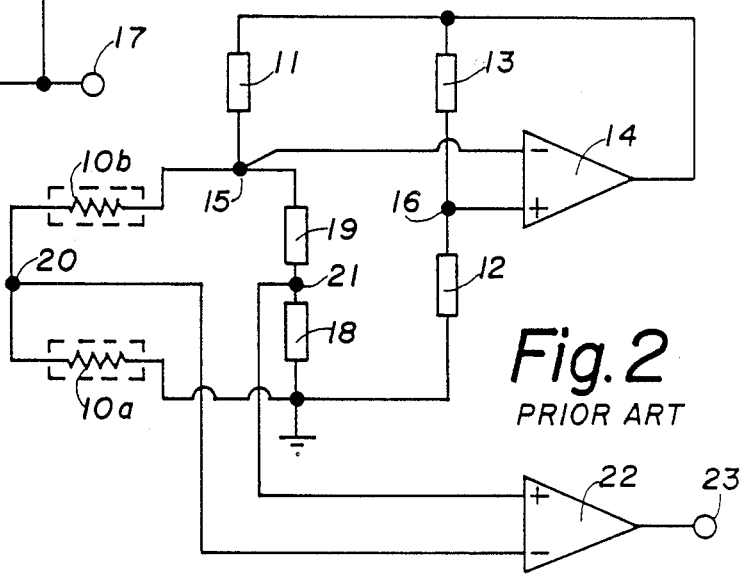
FIG. 2 illustrates a prior art constant temperature anemometer controlled bridge electrical circuit with bipolar output from a differential sensing element pair.
Figure 5:
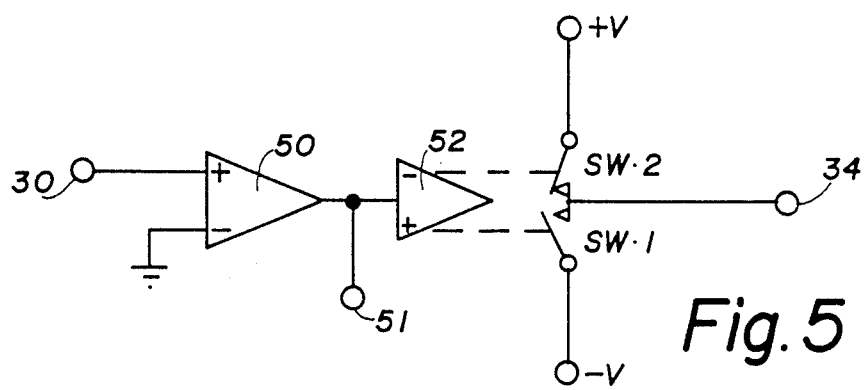
FIG. 5 illustrates a further embodiment of the invention in the form of a circuit addition which is employed to obtain bipolar operation.

FIG. 5 illustrates a circuit addition which may be used to provide bipolar operation of the embodiment shown in FIG. 3. The FIG. 5 signal input 30 and reference output 34 are each connected to corresponding points 30 and 34 of FIG. 3. By way of example, a bipolar input signal may be taken from differential amplifier 22 output 23 of the FIG. 2 constant temperature anemometer bridge circuit to both the FIG. 3 and FIG. 5 circuits at point 30. Comparator 50 is connected to signal input 30 which is compared with ground potential in order to determine a polarity sign sense signal 51 which controls driver/switch 52 and is also used for the sign bit when a digital output is desired. Logical "1" corresponds to a positive going signal and logical "0" corresponds to negative going signals and the sign bit can be used together with the magnitude coding of FIG. 3 comparator circuits to provide what is known as "sign plus magnitude coding", one of the most basic digital coding formats. A Siliconix type Si3002 (Monolithic SPDT MOS Switch with Driver) may be used for driver/switch 52 and a logical "0" at the input 51 to driver/switch 52 closes SW1 and opens SW2. Logical "1" opens SW1 and closes SW2. A positive signal input at 30 causes reference point 34 to be connected to the +V voltage reference source. A negative signal flips the switch and connects 34 to the −V voltage reference source. Since the polarity of both the reference and the wind input signals are synchronous, the FIG. 3 circuit becomes bipolar.

In some thermal anemometer instruments a composite bidirectional or bipolar wind signal is not provided by the constant temperature anemometer circuit and the wind signal may be unipolar while a separate bipolar sign sense signal may be determined. In this case the signal polarity to the comparator reference resistor divider would remain unchanged while the polarity of the reference voltage fed to the output amplifier 48 alone may be switched by the sign sense signal.

FIG. 6 illustrates a "Truth Table" which summarizes the "sign plus magnitude" coding format for the preferred embodiment above described. Coding for a bipolar system is shown as well as that for the unipolar system.

Clearly, many modifications and variations of the present invention are possible in light of the above teachings. For example, in the case of bipolar operation, an absolute value amplifier can be used at the signal input to the comparator string to convert a bipolar input signal to a unipolar signal and a separate sign sensing comparator can be used without the need to change reference voltage polarity. It is therefore to be understood that within the scope of the appended claims the invention may be practiced otherwise than as specifically described.

What is claimed is:

1. A constant temperature thermal anemometer comprising:
   (a) an electrical feedback controlled anemometer transducer bridge;
   (b) said transducer bridge electrical signal output operatively connected to parallel, plural, dual input, signal level comparator means;
   (c) said plural comparator means second input is operatively connected consecutively to a tapped resistance voltage divider reference level network;
   (d) wherein said voltage divider network is operatively connected between two different voltage potential;
   (e) said comparators provide compared input analog signal level versus reference level induced dual-state outputs as a digital representation of the non-linear constant temperature transducer sensed physical input to said transducer; the transducer further including,
   (f) an output amplifier with selectable non-linearly tapped input signal attenuator means controlled by aforesaid comparator outputs with said attenuator connected through switch means to a fixed reference voltage potential;
   (g) wherein said comparator outputs consecutively actuate said switch means thereby connecting taps of said input signal attenuator to said fixed reference voltage potential as each aforesaid successive comparator changes its operating state sequentially from a digitally represented minima to a digitally represented maxima, and the reverse, in accordance with and tracking said non-linear transducer bridge electrical output signal; and
   (h) thereby producing a linearized analog signal representation of the transducer bridge output signal at the output of said output amplifier.

2. The thermal anemometer of claim 1 further including comparator means whose inputs are operatively connected to ground potential reference and to said transducer bridge electrical output signal in order to provide a digitally represented polarity signal output.

3. A thermal anemometer according to claim 1 further including:
   (a) comparator means whose inputs are operatively connected to ground potential and to said transducer bridge output signal to provide a digitally represented polarity sign output; and
   (b) said comparator means operatively connected to drive selector switch means in order to actuate the selection of one of two different polarity fixed reference voltage potentials in accordance with the polarity sign of said transducer bridge output signal thereby providing a bipolar analog signal representation of the linearized transducer bridge signal at the output of said output amplifier.

4. A transducer instrument comprising:
   (a) an analog electrical output transducer;
   (b) said transducer electrical output signal operatively connected to parallel plural signal level comparator means;
   (c) said plural comparator means second input is operatively connected consecutively to a tapped resistance voltage divider reference level network;
   (d) wherein said voltage divider network is operatively connected between a fixed reference voltage potential and ground potential; and
   (e) said comparator provide compared input analog signal level versus signal level versus reference level induced dual-state outputs as a digital representation of the transducer sensed physical input to said transducer; the transducer further including,
   (f) an output amplifier with selectable non-linearly tapped input signal attenuator means controlled by aforesaid comparator outputs with said attenuator connected through switch means to aforesaid reference voltage potential;
   (g) wherein said comparator outputs consecutively actuate said switch means thereby connecting taps of said input signal attenuator to said fixed reference voltage potential as each aforesaid successive comparator changes its operating state sequentially from a digitally represented maxima to a digitally represented maxima, and the reverse, in accordance with and tracking said transducer non-linear electrical output signal; and
   (h) thereby producing a linearized analog signal representation of the transducer output signal at the output of said output amplifier.

5. The transducer instrument of claim 4 further including comparator means whose inputs are operatively connected to ground potential reference and to said transducer electrical output signal in order to provide a digitally represented polarity sign output.

6. A transducer instrument according to claim 4 further including:
   (a) comparator means whose inputs are operatively connected to ground potential and to said transducer output signal to provide a digitally represented polarity sign output; and (b) said comparator means is operatively connected to drive selector switch means in order to actuate the selection of one of two different polarity fixed reference voltage potentials in accordance with the polarity sign of said transducer output signal thereby providing a bipolar analog signal representation of the transducer signal at the output of said output amplifier.

* * * * *

UNITED STATES PATENT AND TRADEMARK OFFICE
CERTIFICATE OF CORRECTION

PATENT NO. : 4,794,794

DATED : January 3, 1989

INVENTOR(S) : Robert S. Djorup

It is certified that error appears in the above-identified patent and that said Letters Patent is hereby corrected as shown below:

```
Column 1, line 48, "3,220,225" should be --3,220,255--.
Column 4, line 4, after "respectively", insert --.--.
Column 5, lines 46-47, "resistance" should be --resistive--;
          line 50, "potential" should be --potentials--.
Column 6, lines 31-32, "resistance" should be --resistive--;
          line 51, "maxima" should be --minima--.
Column 7, line 1, delete "is".
```

Signed and Sealed this

Thirtieth Day of May, 1989

Attest:

DONALD J. QUIGG

*Attesting Officer*

*Commissioner of Patents and Trademarks*